(12) United States Patent
Wu et al.

(10) Patent No.: US 12,482,818 B2
(45) Date of Patent: Nov. 25, 2025

(54) BATTERY

(71) Applicant: APh ePower Co., Ltd., Kaohsiung (TW)

(72) Inventors: Jui-Hsuan Wu, Kaohsiung (TW); Shih Po Ta Tsai, Kaohsiung (TW); Ying-Fang Chao, Tainan (TW)

(73) Assignee: APh ePower Co., Ltd., Kaohsiung (TW)

( * ) Notice: Subject to any disclaimer, the term of this patent is extended or adjusted under 35 U.S.C. 154(b) by 551 days.

(21) Appl. No.: 17/978,997

(22) Filed: Nov. 2, 2022

(65) Prior Publication Data

US 2023/0207795 A1 Jun. 29, 2023

(30) Foreign Application Priority Data

Dec. 24, 2021 (TW) .................. 110148695

(51) Int. Cl.
*H01M 4/485* (2010.01)
*H01M 4/02* (2006.01)

(52) U.S. Cl.
CPC ...... *H01M 4/485* (2013.01); *H01M 2004/021* (2013.01); *H01M 2004/028* (2013.01)

(58) Field of Classification Search
CPC ........... H01M 4/485; H01M 2004/021; H01M 2004/028; H01M 4/131; H01M 4/661; H01M 10/0525; H01M 2010/4292; H01M 4/463; H01M 4/62; H01M 10/052; H01M 10/054
See application file for complete search history.

(56) References Cited

U.S. PATENT DOCUMENTS

2009/0297869 A1* 12/2009 Gomi ................... B32B 37/00
428/448
2021/0313617 A1* 10/2021 Yushin .................. H01M 4/366

FOREIGN PATENT DOCUMENTS

| CN | 101821878 | | 7/2014 |
| CN | 104993130 | | 10/2015 |
| CN | 109888241 | | 6/2019 |
| CN | 109888241 A | * | 6/2019 |
| CN | 113711418 | | 11/2021 |

OTHER PUBLICATIONS

Machine translation CN-109888241-A (Year: 2019).*
Panpan Wang, Zhe Chen, Zhenyuan Ji, Yuping Feng, Jiaqi Wang, Jie Liu, Mengmeng Hu, Hua Wang, Wei Gan, Yan Huang, A flexible aqueous Al ion rechargeable full battery, Chemical Engineering Journal, vol. 373, 2019, pp. 580-586 (Year: 2019).*
Xiaozhou Ye, Huiru Hu, Huan Xiong, Yun Wang, Jianfeng Ye, Rational synthesis and lithium storage properties of hierarchical nanoporous TiO2(B) assemblies with tailored crystallites and architectures, Journal of Colloid and Interface Science, vol. 600 (Year: 2021).*

(Continued)

*Primary Examiner* — Nicole M. Buie-Hatcher
*Assistant Examiner* — Sarah Arimintia Applegate
(74) *Attorney, Agent, or Firm* — JCIPRNET

(57) ABSTRACT

A battery includes an electrolyte and a positive electrode. The electrolyte is configured to produce active substance. The active substance in the battery is intercalated to a lattice structure of the positive electrode to generate power of the battery.

8 Claims, 1 Drawing Sheet

(56) References Cited

OTHER PUBLICATIONS

A. P. Alekhin, A. A. Chouprik, S. A. Gudkova, A. M. Markeev, Yu. Yu. Lebedinskii, Yu. A. Matveyev, A. V. Zenkevich; Structural and electrical properties of thin films grown by atomic layer deposition. J. Vac. Sci. Technol. B Jan. 1, 2011; 29 (1): 01A302. https://doi.org/10.1116/1.3533763 (Year: 2011).*

Shiyu He, Aijia Wei, Wen Li, Xue Bai, Lihui Zhang, Lili Yang, Zhenfa Liu, Al—Ti-oxide coated LiCoO2 cathode material with enhanced electrochemical performance at a high cutoff charge potential of 4.5V, Journal of Alloys and Compounds, vol. 799, 2019, pp. 137-146 (Year: 2019).*

Engineered Materials Handbook®—Desk Edition Table 1. Properties of Structural Ceramic Materials. Retrieved from https://app.knovel.com/hotlink/itble/rcid:kpEMHDE004/id:kt012151F5/engineered-materials/table-1-properties-structural. (Year: 1995).*

Machine translation of CN 109888241 A (Year: 2019).*

Feng Wu; et al., "Paving the Path toward Reliable Cathode Materials for Aluminum-Ion Batteries," Advanced Materials, vol. 31, Issue 16, 1806510, Feb. 2019, pp. 1-18.

"Search Report of Europe Counterpart Application", issued on Jul. 21, 2023, p. 1-p. 6.

* cited by examiner

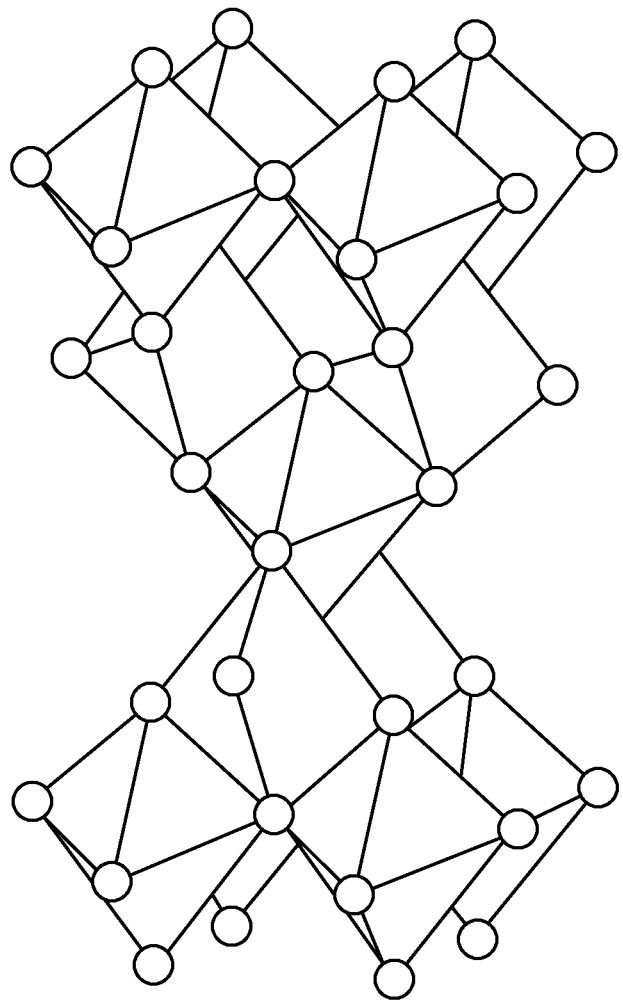
100

BATTERY

CROSS-REFERENCE TO RELATED APPLICATION

This application claims the priority benefit of Taiwan application serial no. 110148695, filed on Dec. 24, 2021. The entirety of the above-mentioned patent application is hereby incorporated by reference herein and made a part of this specification.

BACKGROUND

Technical Field

The disclosure relates to a battery; more particularly, the disclosure relates to a battery of which a positive electrode is made of an improved material.

Description of Related Art

Generally, positive electrodes of most existing batteries often encounter an issue of excessive expansion after multiple charging and discharging operations, which shortens service life of the battery and even leads to short circuit. For instance, when the positive electrode is made of graphite, an active substance in the battery is intercalated into the spacing between layers of graphite of the positive electrode to generate power; however, the positive electrode is prone to be expanded after the active substance is fully intercalated, and the expansion allows a stress to be exerted to a separator diaphragm and easily results in conduction with arborescent crystal generated by a negative electrode plate, which reduces the service life of the battery and even causes short circuits. Therefore, how to resolve the issue of expansion, increase the service life of the battery, and prevent short circuits have become a challenge in the pertinent field.

SUMMARY

The disclosure provides a battery having increased power while an issue of expansion is resolved, a service life of the battery is increased, and short circuit is prevented.

An embodiment of the disclosure provides a battery that includes an electrolyte and a positive electrode. The electrolyte is configured to produce active substance. The active substance is intercalated into a lattice structure of the positive electrode to produce power of the battery.

In an embodiment of the disclosure, the active substance is intercalated into the lattice structure of the positive electrode to form an alloy state.

In an embodiment of the disclosure, a material of the positive electrode is aluminum titanate (ATO).

In an embodiment of the disclosure, the ATO accounts for at least more than 50% of the positive electrode.

In an embodiment of the disclosure, the lattice structure is titanium dioxide ($TiO_2$) brookite lattice.

In an embodiment of the disclosure, a service cycle count of the battery is at least more than 50 cycle counts.

In an embodiment of the disclosure, an expansion thickness of the positive electrode is at least less than or equal to 100 microns.

In an embodiment of the disclosure, a coefficient of thermal expansion of a material of the positive electrode is at least smaller than $1\times10^{-6}/°C$.

In an embodiment of the disclosure, the battery is an aluminum battery.

In an embodiment of the disclosure, the active substance is an aluminum ion ($Al^{3+}$).

In view of the above, according to one or more embodiments of the disclosure, the selection of the material of the positive electrode and the use of the positive electrode with the lattice structure mitigate the issue of expansion after the intercalation of the active substance and allow the storage of ions for generating power. Therefore, the power of the battery may be increased while the issue of expansion is mitigated, the service life of the battery is extended, and short circuits are prevented.

To make the aforementioned more comprehensible, several embodiments accompanied with the drawing are described in detail as follows.

BRIEF DESCRIPTION OF THE DRAWINGS

The accompanying drawing is included to provide a further understanding of the disclosure, and is incorporated in and constitute a part of this specification. The drawing illustrates embodiments of the disclosure and, together with the description, serve to explain the principles of the disclosure.

The FIG. 1s a schematic view of a structure of a material of a positive electrode of a battery according to an embodiment of the disclosure.

DESCRIPTION OF THE EMBODIMENTS

The embodiments of the disclosure are disclosed in the following drawing, and for the purpose of clarity, details for implementation are incorporated below. However, it should be understood that the details are not intended to limit the scope of disclosure. That is, in some embodiments of the disclosure, these details are not necessarily required. Moreover, for simplicity of the drawing, some of the conventional structures and components are described in a simplified schematic manner.

Unless defined otherwise, all terminologies (including technical and scientific terminologies) used herein denote the same meaning as commonly understood by those of ordinary skill in the pertinent art to which the application belongs.

The FIG. 1s a schematic view of a structure of a material of a positive electrode of a battery according to an embodiment of the disclosure. With reference to the FIGURE, a battery provided in this embodiment includes an electrolyte and a positive electrode. The electrolyte is configured to produce active substance. The active substance in the battery is intercalated to a lattice structure 100 of the positive electrode to generate power of the battery. Accordingly, the selection of the material of the positive electrode and the use of the positive electrode with the lattice structure 100 mitigate the issue of expansion after the intercalation of the active substance and allow the storage of ions for generating power. Therefore, the power of the battery may be increased while the issue of expansion is mitigated, the service life of the battery is extended, and short circuits are prevented. To be specific, the active substance in the battery may be interlaced into the lattice structure of the positive electrode, so as to form an alloy state and thereby generate the power. That is, in the battery provided in this embodiment, the power is not generated by interlacing the active substance into the spacing between graphite layers.

In some embodiments, the material of the positive electrode is aluminum titanate (ATO) (CAS:12004-39-6), and the lattice structure is titanium dioxide brookite lattice.

During a battery charging and discharging process, the titanium dioxide brookite lattice of the ATO may effectively provide power, and no obvious expansion of the positive electrode is observed. Hence, if the material of the positive electrode is ATO, the issue of the expansion of the positive electrode may be mitigated, and the power may be increased. For instance, when the material of the positive electrode is ATO, a service cycle of the battery is at least more than 50 cycle counts; when the material of the positive electrode is graphite, the service cycle of the battery is less than 50 cycle counts. Hence, given that ATO is used as the material of the positive electrode, the service cycle of the battery may be increased to 100 cycle counts, i.e., increased by about 100%. In addition, an expansion thickness of the positive electrode is at least less than or equal to 100 microns. For instance, when the material of the positive electrode is graphite, the expansion thickness is about 375 microns, and when ATO serves as the material of the positive electrode, the expansion thickness is about 100 microns. On the other hand, when the material of the positive electrode is changed from graphite to ATO, the power of the battery may be increased from 48 milliampere hours (mAh) to 51 milliampere hours, so the issue of the expansion of the battery and the service life and power of the battery are all improved, which should however not be construed as a limitation in the disclosure. The service cycle of the battery and the thickness of the positive electrode depend on the selection of the material of the positive electrode. As long as the active substance in the battery is intercalated into the lattice structure of the positive electrode to generate the power of the battery, it does not deviate from the scope of protection described in the disclosure.

In some embodiments, a coefficient of thermal expansion of the material of the positive electrode is at least less than $1\times10^{-6}/°$ C.; that is, the material of the positive electrode may have a relatively low coefficient of thermal expansion. When reacting with anions, the substantial structure of the positive electrode is not expanded or contracted, i.e., changes to the form of the positive structure do not easily occur. Hence, while the ions are stored to generate the power, the positive electrode is not expanded, which leads to the extension of the service life of the battery. However, the disclosure is not limited thereto.

In some embodiments, ATO accounts for at least more than 50% of the positive electrode (in a mixed form) to achieve a favorable intercalation effect, which should however not be construed as a limitation in the disclosure.

In some embodiments, the battery is an aluminum battery; therefore, the active substance is aluminum ion ($Al^{3+}$), and $Al^{3+}$ and ATO lattice form an alloy state to generate power. However, the type of the battery should not be construed as a limitation in the disclosure; as long as the material of the positive electrode of the battery may be applied in the same mechanism as described herein, it does not deviate from the scope of protection described in the disclosure.

Note that other unspecified specifications and compositions of the battery (e.g., a negative electrode, a separator diaphragm, an electrolyte, and so on) may be derived by people having ordinary skill in the pertinent art from any content covering the spirits and scope of protection provided in the claims.

To sum up, according to one or more embodiments of the disclosure, the selection of the material of the positive electrode and the use of the positive electrode with the lattice structure mitigate the issue of expansion after the intercalation of the active substance and allow the storage of ions for generating power. Therefore, the power of the battery may be increased while the issue of expansion is mitigated, the service life of the battery is extended, and short circuits are prevented.

It will be apparent to those skilled in the art that various modifications and variations can be made to the disclosed embodiments without departing from the scope or spirit of the disclosure. In view of the foregoing, it is intended that the disclosure covers modifications and variations provided they fall within the scope of the following claims and their equivalents.

What is claimed is:

1. An aluminum battery, comprising:
   an electrolyte, configured to produce an active substance; and
   a positive electrode, wherein the active substance in the aluminum battery is intercalated into a lattice structure of the positive electrode to produce power of the aluminum battery, wherein the active substance in the aluminum battery is intercalated into the lattice structure of the positive electrode to form an alloy state.

2. The aluminum battery according to claim 1, wherein a material of the positive electrode is aluminum titanate.

3. The aluminum battery according to claim 2, wherein the aluminum titanate accounts for more than 50% of the positive electrode.

4. The aluminum battery according to claim 2, wherein the lattice structure is titanium dioxide brookite lattice.

5. The aluminum battery according to claim 2, wherein a service cycle count of the battery is more than 50 cycle counts.

6. The aluminum battery according to claim 2, wherein an expansion thickness of the positive electrode is less than or equal to 100 microns.

7. The aluminum battery according to claim 1, wherein a coefficient of thermal expansion of a material of the positive electrode is smaller than $1\times10^{-6}/°$ C.

8. The aluminum battery according to claim 1, wherein the active substance is an aluminum ion.

* * * * *